United States Patent
Sasaki et al.

(10) Patent No.: US 10,991,969 B2
(45) Date of Patent: Apr. 27, 2021

(54) ENERGY STORAGE DEVICE

(71) Applicant: GS Yuasa International Ltd., Kyoto (JP)

(72) Inventors: Takeshi Sasaki, Kyoto (JP); Taro Yamafuku, Kyoto (JP); Masaki Masuda, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 1298 days.

(21) Appl. No.: 14/824,369

(22) Filed: Aug. 12, 2015

(65) Prior Publication Data

US 2016/0049685 A1 Feb. 18, 2016

(30) Foreign Application Priority Data

Aug. 18, 2014 (JP) .............................. JP2014-166127

(51) Int. Cl.
| | |
|---|---|
| *H01M 10/04* | (2006.01) |
| *H01M 4/587* | (2010.01) |
| *H01M 4/583* | (2010.01) |
| *H01M 10/0525* | (2010.01) |
| *H01M 10/052* | (2010.01) |

(52) U.S. Cl.
CPC ....... *H01M 10/0431* (2013.01); *H01M 4/583* (2013.01); *H01M 4/587* (2013.01); *H01M 10/0525* (2013.01); *H01M 10/052* (2013.01)

(58) Field of Classification Search
CPC ........... H01M 10/0431; H01M 10/052; H01M 10/0525; H01M 4/583; H01M 4/587
See application file for complete search history.

(56) References Cited

U.S. PATENT DOCUMENTS

| | | |
|---|---|---|
| 6,451,474 B1 | 9/2002 | Kozu |
| 2003/0129479 A1 | 7/2003 | Shimozono |
| 2012/0164503 A1 | 6/2012 | Ishikawa |

FOREIGN PATENT DOCUMENTS

| | | |
|---|---|---|
| JP | 2000149892 A | 5/2000 |
| JP | 2000182573 | 6/2000 |
| JP | 2003346876 A2 | 12/2003 |
| JP | 3556636 B2 | 8/2004 |
| JP | 2006244834 A2 | 9/2006 |
| JP | 2007103295 | 4/2007 |
| JP | 2007103295 A2 | 4/2007 |

(Continued)

OTHER PUBLICATIONS

Ariga et al., machine translation for JP 2013-115033, Japan Platform for Patent Information (Year: 2013).*

*Primary Examiner* — Adam A Arciero

(74) *Attorney, Agent, or Firm* — Rankin, Hill & Clark LLP

(57) ABSTRACT

An energy storage device includes: a flattened electrode assembly formed by winding electrodes such that a hollow portion is formed, the electrode assembly including a pair of curved portions opposed manner in a major axis direction and a pair of flat portions opposed in a minor axis direction; and a case storing the electrode assembly therein, wherein assuming a thickness of the flat portion in the minor axis direction as A, a thickness of the curved portion in a radial direction as B, and a thickness of the hollow portion in the minor axis direction as W, the electrode assembly satisfies $A+(W/2) \leq B$ in a state where the electrode assembly is discharged.

9 Claims, 8 Drawing Sheets

(56) References Cited

FOREIGN PATENT DOCUMENTS

| | | |
|---|---|---|
| JP | 2007157560 A2 | 6/2007 |
| JP | 4679104 B2 | 4/2011 |
| JP | 2011134685 A2 | 7/2011 |
| JP | 2012079501 A2 | 4/2012 |
| JP | 2013115033 A2 | 6/2013 |
| JP | 2013214456 A2 | 10/2013 |
| JP | 2013239313 A2 | 11/2013 |
| JP | 2014035867 A | 2/2014 |
| JP | 2014082157 A2 | 5/2014 |
| WO | 2012014422 A1 | 2/2012 |

* cited by examiner

ENERGY STORAGE DEVICE

CROSS-REFERENCE TO RELATED APPLICATIONS

This application claims the benefit of Japanese patent application No. 2014-166127, filed on Aug. 18, 2014, which is incorporated by reference.

FIELD

The present invention relates to a chargeable and dischargeable energy storage device.

BACKGROUND

Conventionally, there has been known a secondary battery which includes: a winding-type electrode assembly formed by winding a strip-like electrodes; and a case which stores the electrode assembly therein (see JP-A-2013-214456 (PTL 1)). The electrode assembly has a flattened cylindrical shape. To be more specific, the electrode assembly has a minor axis and major axis which are orthogonal to each other, and includes: a pair of curved portions which face each other in an opposed manner in a major axis direction; and a pair of flat portions which connects corresponding end portions of the pair of curved portions to each other and faces each other in an opposed manner in a minor axis direction.

In the secondary battery, the electrode assembly expands or shrinks due to charging and discharging. In the secondary battery, electrodes are deteriorated due to the repetition of charging and discharging, and the electrode assembly expands due to the deposition of a reaction byproduct (a film, a gas or the like) generated attributed to the deterioration on surfaces of the electrodes.

In the secondary battery, there is a case where a wrinkle is formed on a surface of an electrode in a direction orthogonal to a winding direction (minor axis direction of the electrode) due to expansion or shrinkage of the electrode assembly. To be more specific, in the flat portion of the electrode assembly, the expanded electrode is, e.g., curved such that the electrode expands toward a hollow portion so that the expansion is absorbed whereby a stress attributed to the expansion minimally occurs in the electrode. Accordingly, a wrinkle is minimally formed on the electrode at the flat portion. However, in the curved portion of the electrode assembly, electrodes are densely wound around and hence, the expanded electrode cannot move in the radial direction and intends to move in the winding direction. Accordingly, a stress attributed to the expansion is liable to be concentrated on a boundary portion between the curved portion and the flat portion in the electrode assembly and hence, a wrinkle is liable to be formed on the electrode at the boundary portion in the direction orthogonal to the winding direction.

When the wrinkle is formed in the electrode in this manner, a resistance in a portion where the wrinkle is formed is increased and hence, lowering of capacity, an electrode-position or the like is liable to occur in the electrode assembly.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

Accordingly, it is an object of the present invention to provide an energy storage device where the formation of a wrinkle on an electrode which forms an electrode assembly can be suppressed at a boundary portion between a curved portion and a flat portion of the electrode assembly.

An energy storage device according to an aspect of the present invention includes: a flattened electrode assembly formed by winding electrodes such that a hollow portion is formed at a center of winding, the electrode assembly having a minor axis and a major axis which are orthogonal to each other, the electrode assembly including a pair of curved portions opposed in the major axis direction and a pair of flat portions opposed in the minor axis direction, the flat portions connecting corresponding end portions of the curved portions to each other; and a case storing the electrode assembly therein, wherein assuming a thickness of the flat portion in the minor axis direction as A, a thickness of the curved portion in a radial direction as B, and a thickness of the hollow portion in the minor axis direction as W, the electrode assembly satisfies a following formula in a state where the electrode assembly is discharged.

$$A+(W/2) \leq B$$

BRIEF DESCRIPTION OF DRAWINGS

The foregoing and other features of the present invention will become apparent from the following description and drawings of an illustrative embodiment of the invention in which.

DESCRIPTION OF EMBODIMENTS

Figure 1:
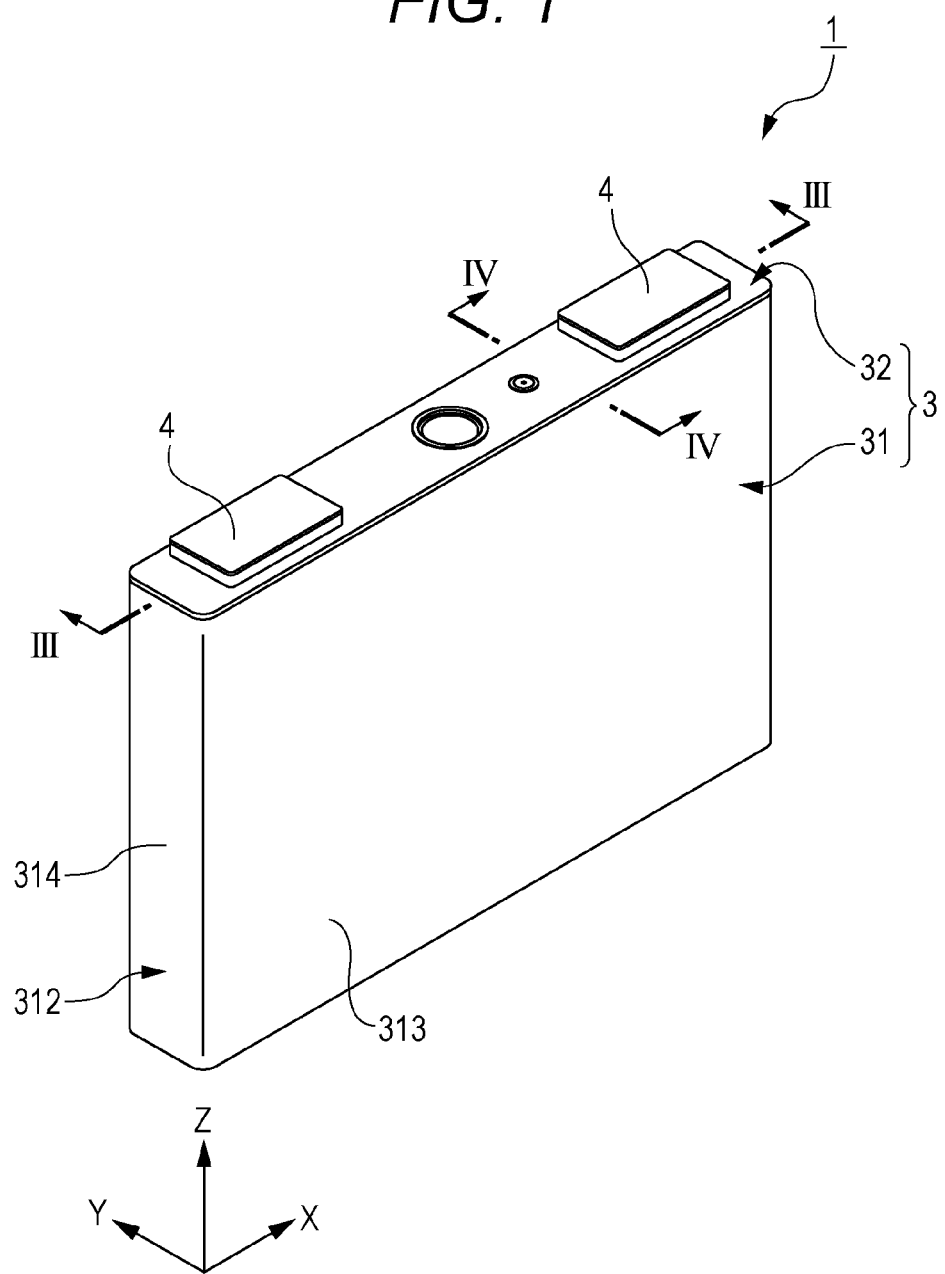
FIG. 1 is a perspective view of an energy storage device according to one embodiment of the present invention.
Figure 2:
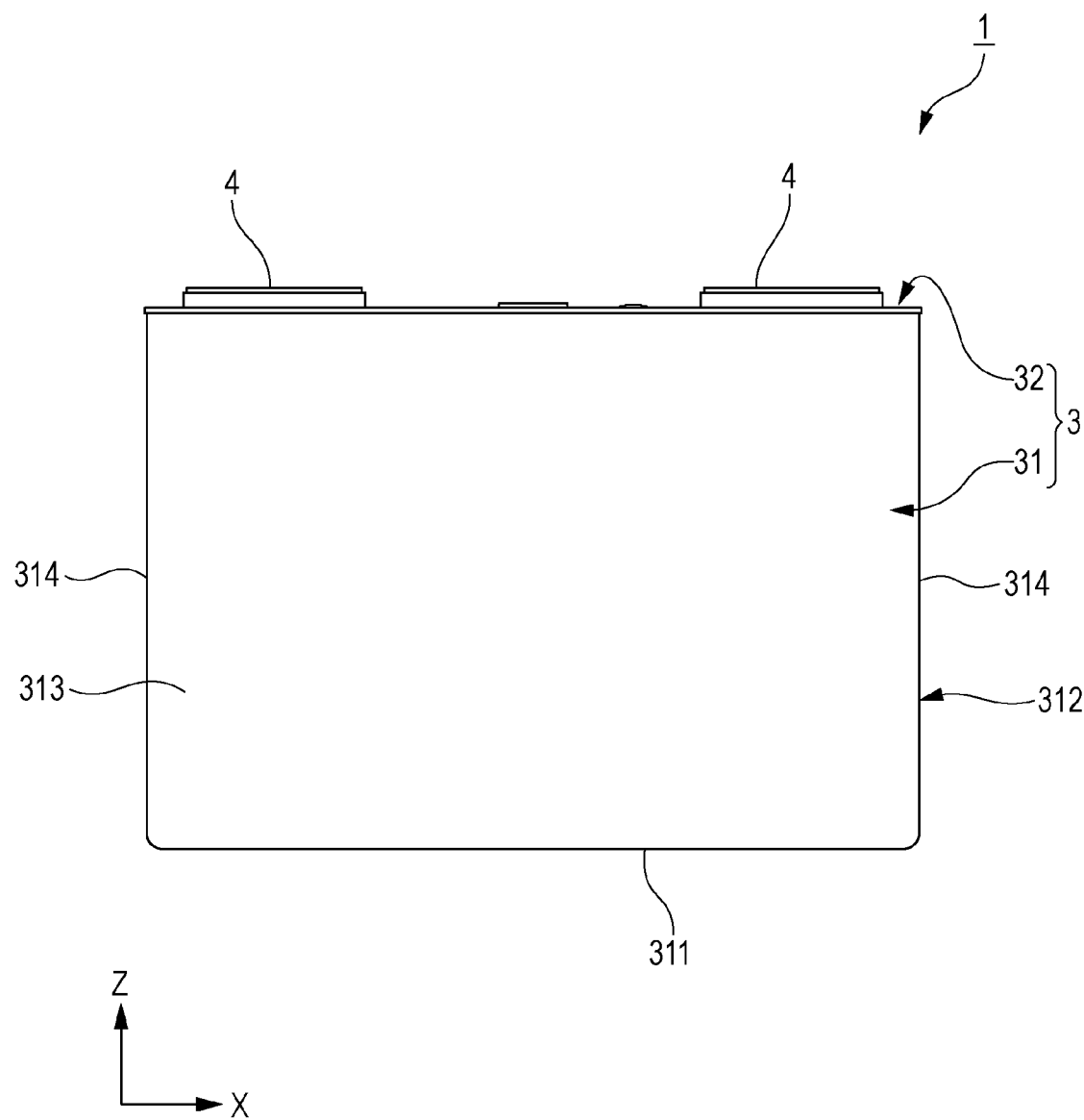
FIG. 2 is a front view of the energy storage device.
Figure 3:
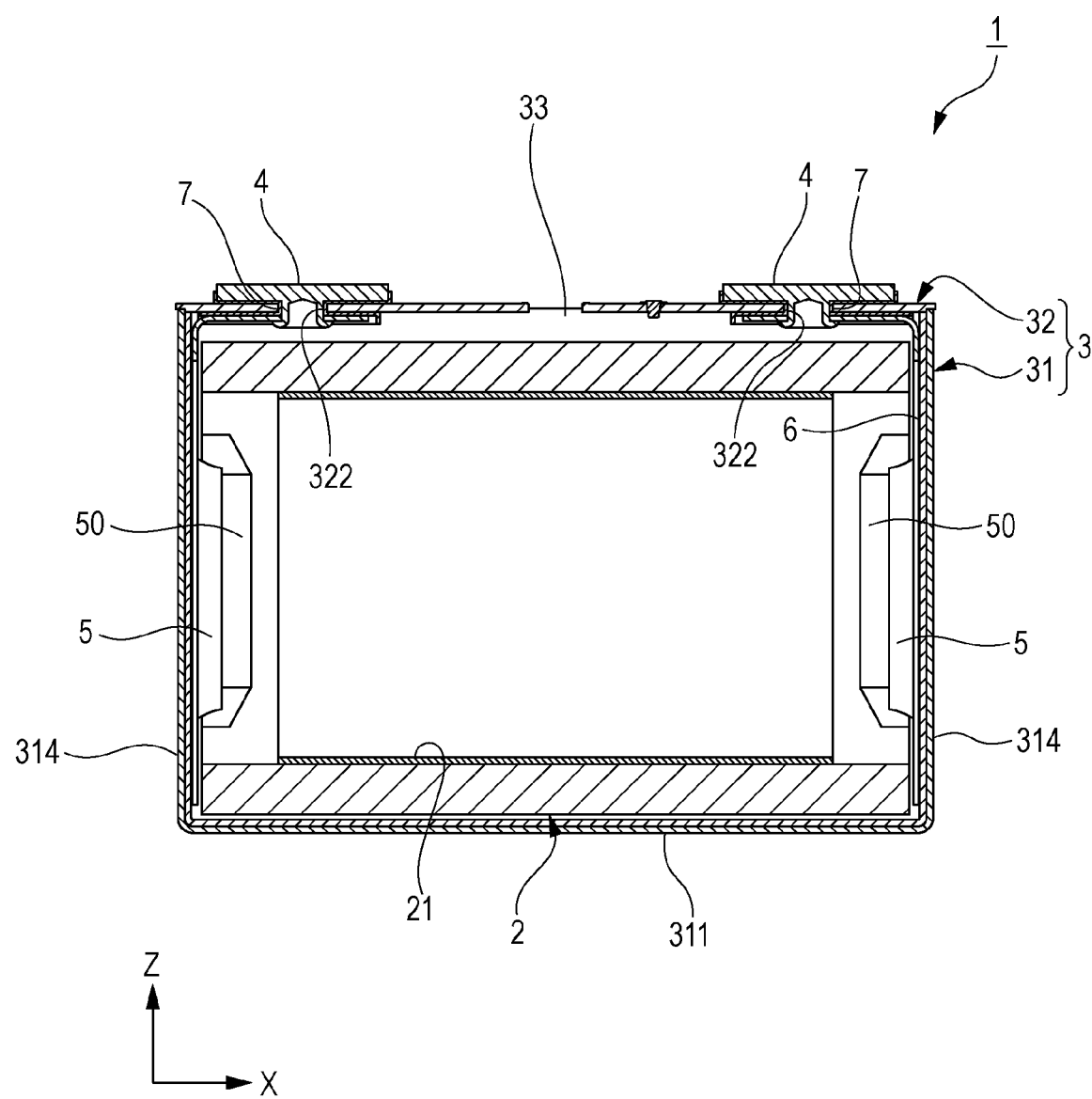
FIG. 3 is a cross-sectional view taken along a line III-III in FIG. 1.
Figure 4:
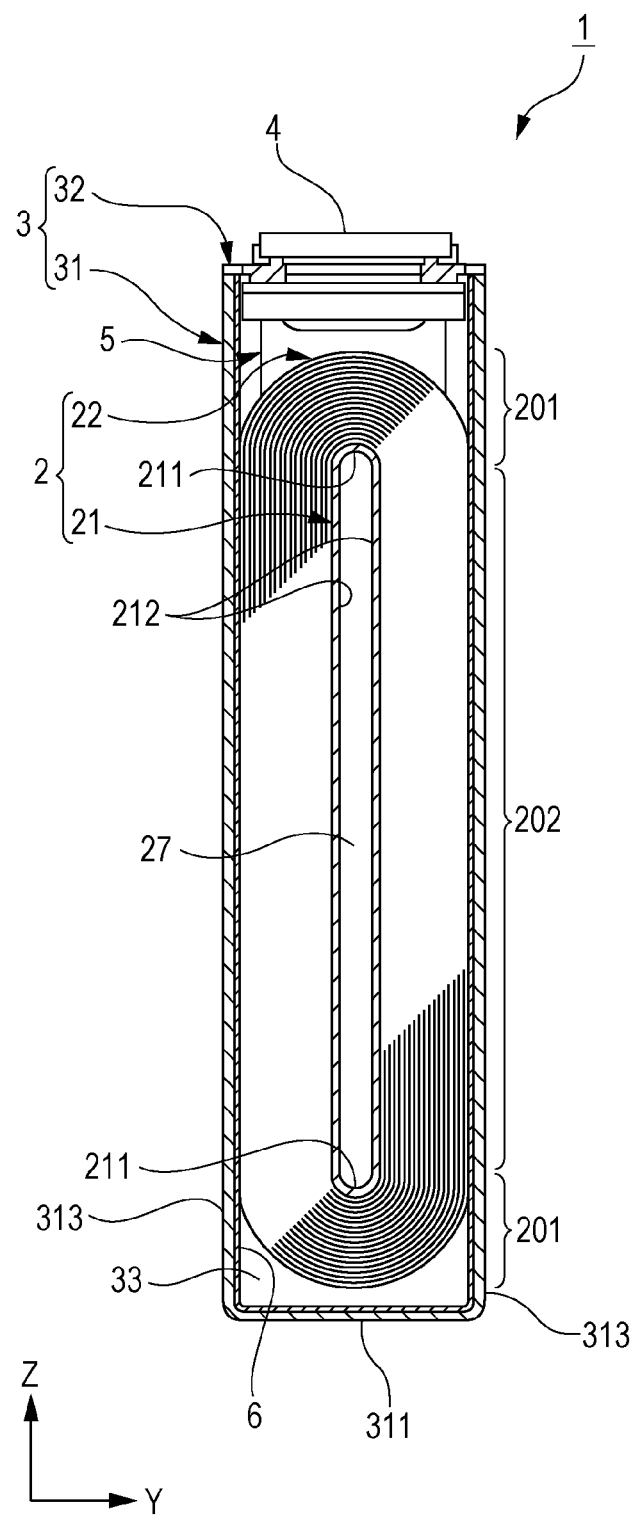
FIG. 4 is a cross-sectional view taken along a line IV-IV in FIG. 1.
Figure 5:
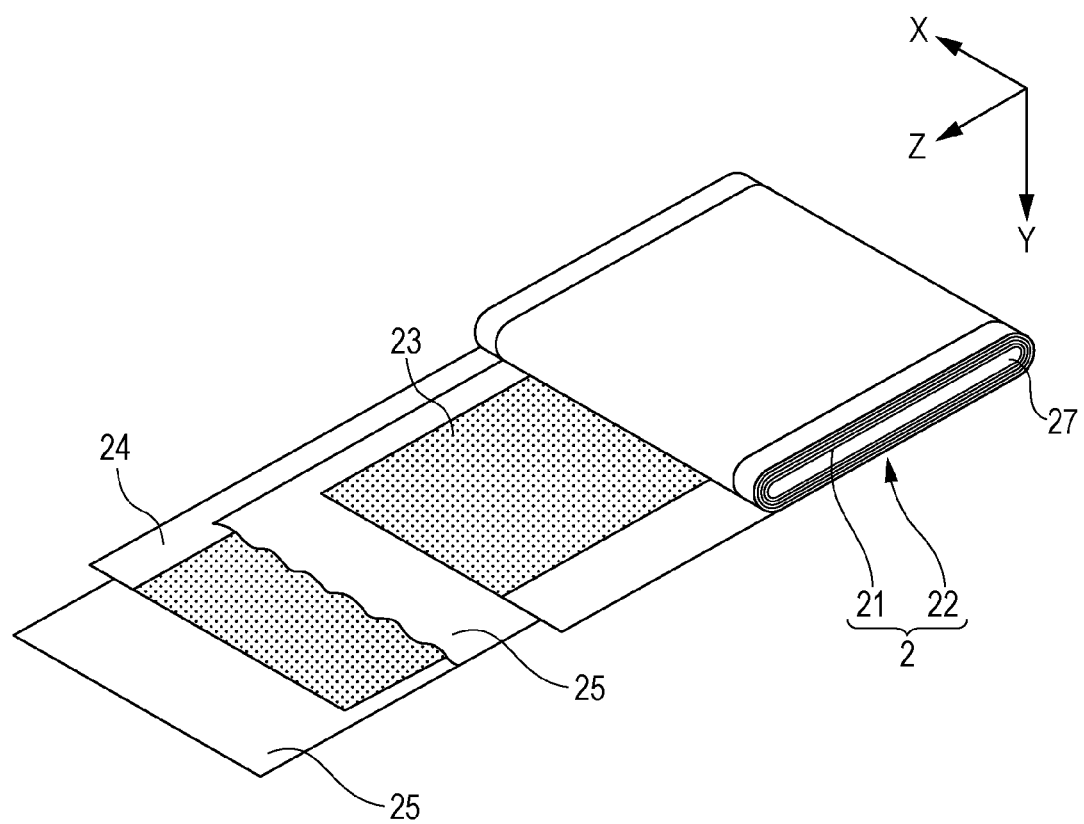
FIG. 5 is a view describing a configuration of an electrode assembly of the energy storage device.

An energy storage device according to an aspect of the present invention includes: a flattened electrode assembly formed by winding electrodes such that a hollow portion is formed at a center of winding, the electrode assembly having a minor axis and a major axis which are orthogonal to each other, the electrode assembly including a pair of curved portions opposed in the major axis direction and a pair of flat portions opposed in the minor axis direction, the flat portions connecting corresponding end portions of the curved portions to each other; and a case storing the electrode assembly therein, wherein assuming a thickness of the flat portion in the minor axis direction as A, a thickness of the curved portion in a radial direction as B, and a thickness of the hollow portion in the minor axis direction as W, the electrode assembly satisfies a following formula in a state where the electrode assembly is discharged.

$$A+(W/2) \leq B$$

The above-mentioned parameters are measured in a state where the electrode assembly is stored in the case. The above-mentioned formula is satisfied in a state where the electrode assembly is stored in the case. The same goes for formulae described later.

As described above, the curved portion has a thickness size equal to or larger than a size of the flat portion in a thickness direction (thickness of flat portion in minor axis (layered) direction+½ of size of hollow portion in minor axis direction) when the generation of a stress attributed to the expansion is suppressed by the absorption of the expansion of the electrode due to charging by bending of the electrode toward the hollow portion. Accordingly, a distance between electrodes in the layered direction (radial direction) in the curved portion is increased to a size at which the expansion of the electrode due to charging can be absorbed. That is, the movement of the electrode forming the curved portion can be moved in the radial direction in the curved portion and hence, it is possible to suppress the concentration of a stress attributed to the expansion on a boundary portion between a flat portion and a curved portion. As a result, the formation of a wrinkle on the electrode forming the boundary portion can be suppressed on the boundary portion.

In the energy storage device, the electrode assembly may include a cylindrical winding core which surrounds the hollow portion, and the electrodes may be wound around the periphery of the winding core.

With such a configuration, the winding core has a hollow cylindrical shape and hence, unlike a solid winding core, the electrode which forms the flat portion can be bent toward the hollow portion side. Accordingly, when the electrode which forms the flat portion expands, bending (expansion) of the electrode toward the hollow portion side is allowed and, as a result, the formation of a wrinkle when the electrode at the flat portion expands can be suppressed. Further, when the electrode shrinks, a reaction force is imparted to the electrode by the winding core from the hollow portion side and hence, the formation of a wrinkle when the electrode shrinks can be also suppressed.

In this case, the electrode assembly may satisfy the following formula in a state where the electrode assembly is discharged.

$$A+(\pi/4)W \leq B$$

Figure 7:
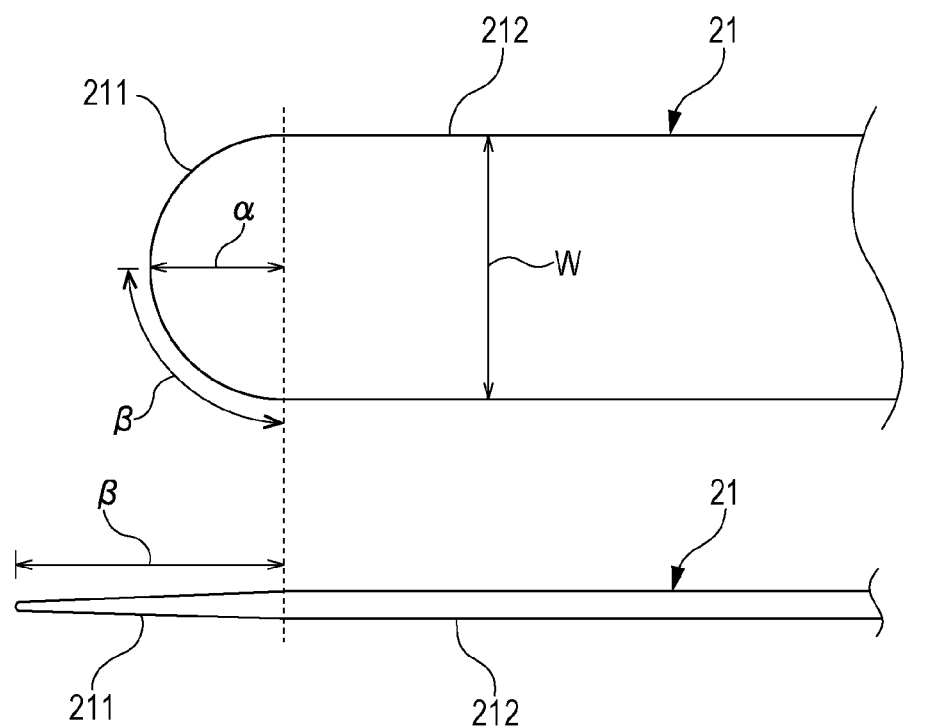
FIG. 7 is a schematic view describing a size of extension of a winding core in a major axis direction when the winding core collapses in a minor axis direction.
Figure 7:
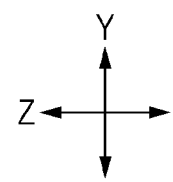

By setting a thickness of the curved portion by taking into account a size of extension of a winding core in a major axis direction when the winding core collapses in a minor axis direction $((\pi/4)-(\frac{1}{2}))W$, even in a state where the winding core collapses in a minor axis direction, the formation of the wrinkle on the electrode assembly having the winding core can be suppressed. The above-mentioned $((\pi/4)-(\frac{1}{2}))W$ is a value obtained by subtracting a length α of a curved portion in a major axis direction in a state where the winding core is not collapsed (in a state where the curved portion has an arcuate shape) from a length β of the curved portion in a major axis direction when the winding core collapses in the minor axis direction as shown in FIG. 7, for example.

In the energy storage device, the electrode assembly may satisfy the following formula in a state where the electrode assembly is discharged.

$$B \leq A+W$$

By setting a thickness B of the curved portion in a radial direction to a value equal to or less than a maximum size that the flat portion can take when the electrode is bent toward the hollow portion so as to absorb the expansion of the electrode due to charging (thickness of flat portion in minor axis direction+size of hollow portion in minor axis direction), it is possible to prevent the occurrence of a case where a distance between electrodes in a layered direction becomes excessively large in the curved portion thus lowering energy density.

In the electrode assembly of the energy storage device, in a state where the electrode assembly is charged, in a region of at least a portion of the hollow portion in the major axis direction, portions of the electrode assembly which face each other with the hollow portion sandwiched therebetween in the minor axis direction may be brought into contact with each other.

With such a configuration, when the electrode is bent toward the hollow portion so as to absorb the expansion due to charging, the oppositely facing portions are brought into contact with each other and hence, a reaction is applied to the portions whereby a wrinkle is minimally formed when the electrode assembly shrinks.

Further, when a size of the hollow portion in a minor axis direction is excessively large, the electrode is liable to be slackened in a minor axis (layered) direction at the flat portion and hence, a distance between the electrodes is increased whereby energy density of the electrode assembly is liable to be lowered. However, by setting the size of the hollow portion in a minor axis direction to an extent that the oppositely facing portions are substantially brought into contact with each other when the electrode assembly is charged, the slackening of the electrode at the flat portion can be suppressed and hence, the lowering of the energy density can be prevented.

In the energy storage device, the case may have an inner space and may store the electrode assembly in the inner space such that the flat portions are respectively brought into contact with the case in an insulated state, and assuming a size of the inner space of the case in a minor axis direction as L, the electrode assembly may satisfy the following formula in a state where the electrode assembly is discharged.

$$W \leq 0.2L$$

With such a configuration, by pressing the electrode assembly from the outside in a minor axis direction by the case and also by setting a size of hollow portion in a minor axis direction to 0.2 L or less by restricting a size of the electrode assembly in a minor axis direction by the case, slackening of the electrode at the flat portion can be suppressed. Accordingly, it is possible to prevent the lowering of energy density of the electrode assembly attributed to the increase of the distance between the electrodes in the layered direction at the flat portion.

In the energy storage device, assuming a thickness of one curved portion out of the pair of curved portions in a radial direction as $B_1$, and a thickness of the other curved portion in the radial direction as $B_2$, the electrode assembly may satisfy the following formula in a state where the electrode assembly is discharged.

$$A+(W/2) \leq B_1 \text{ and } A+(W/2) \leq B_2$$

With such a configuration, at a boundary portion between one curved portion out of the pair of curved portions and the flat portion and at a boundary portion between the other curved portion out of the pair of curved portions and the flat portion, the formation of a wrinkle on the electrode which forms the boundary portions can be suppressed.

As has been described above, according to the aspects of the present invention, it is possible to provide an energy storage device where the formation of a wrinkle on an electrode which forms the electrode assembly can be suppressed at a boundary portion between a curved portion and a flat portion of the electrode assembly.

Hereinafter, one embodiment of an energy storage device according to the present invention is described by reference to FIG. 1 to FIG. 7. The energy storage device may be a secondary battery, a capacitor or the like. In this embodiment, as one example of the energy storage device, a chargeable/dischargeable secondary battery is described. Names of respective components (respective constitutional elements) used in this embodiment are exclusively for this embodiment, and may differ from names of respective components (respective constitutional elements) used in BACKGROUND.

The energy storage device of this embodiment is a non-aqueous electrolyte secondary battery. To be more specific, the energy storage device is a lithium ion secondary battery which makes use of the movement of electrons generated along with the movement of lithium ions. The energy storage device of this type supplies electrical energy. The energy storage devices may be used singly or in plural. To be more specific, when a required output and a required voltage are small, a single storage device is used. On the other hand, when at least one of either a required output or a required voltage is large, the energy storage device is used in combination with other energy storage devices so as to form an energy storage apparatus. In the energy storage apparatus, the energy storage devices which form the energy storage apparatus supply electrical energy.

As shown in FIG. 1 to FIG. 5, the energy storage device includes: an electrode assembly 2 formed by winding electrodes 23, 24; and a case 3 for storing the electrode assembly 2 therein. The energy storage device 1 also includes external terminals 4 which are arranged outside the case 3 and are conductive with the electrode assembly 2. The energy storage device 1 also includes current collectors 5 which make the electrode assembly 2 and the external terminals 4 conductive with each other and the like in addition to the electrode assembly 2, the case 3 and the external terminals 4. The energy storage device 1 in this embodiment is a so-called prismatic energy storage device where the case 3 has an approximately rectangular parallelepiped shape.

The electrode assembly 2 includes: a cylindrical winding core 21 which surrounds a hollow portion 27; and a layered body 22 which is formed by stacking a positive electrode (electrode having a positive polarity) 23 and a negative electrode (electrode having a negative polarity) 24 in a state where the positive electrode 23 and the negative electrode 24 are insulated from each other. The layered body 22 is wound around the winding core 21. In the electrode assembly 2, lithium ions move between the positive electrode 23 and the negative electrode 24 thus enabling charging and discharging of the energy storage device 1.

The electrode assembly 2 is formed by winding the electrodes 23, 24 such that the hollow portion 27 is formed at the center of winding. In this embodiment, the electrode assembly 2 has a flat cylindrical shape, and has a major axis and a minor axis which are orthogonal to each other. To be more specific, the electrode assembly 2 includes: a pair of second curved portions 201 which face each other in an opposed manner in a major axis direction; and a pair of second flat portions 202 which connects corresponding end portions of the pair of second curved portions 201 to each other and faces each other in an opposed manner in a minor axis direction. The electrode assembly 2 is specifically described hereinafter.

The winding core 21 is usually made of an insulating material. The winding core 21 has a cylindrical shape. In this embodiment, the winding core 21 has a flattened cylindrical shape. To be more specific, the winding core 21 includes: a pair of curved portions which face each other in an opposed manner with a distance therebetween (hereinafter referred to as "first curved portions") 211; and a pair of flat portions 212 which face each other in an opposed manner, and connects corresponding end portions of the first curved portions 211 (end portions of the first curved portions 211 which face each other in an opposed manner in the arrangement direction of the pair of first curved portions 211) (hereinafter referred to as "first flat portions") (see FIG. 4). The respective first curved portions 211 are bent so as to project (bulge) to the outside (in the opposite directions away from each other). In the pair of first flat portions 212, each of the flat portions is parallel to each other or substantially parallel to each other. In this embodiment, the winding core 21 is formed by winding a sheet having flexibility or thermoplasticity. The winding core 21 is not limited to a member which is formed as a separate body from the electrode assembly 2. The winding core 21 may be formed such that a portion of the separator 25 which is a component of the electrode assembly 2 extends to the center of winding so as to form the winding core 21.

The sheet is made of a synthetic resin. The sheet has resistance against an electrolyte solution. The sheet is made of polypropylene (PP), polyethylene (PE), polyphenylene sulfide (PPS), for example. A thickness of the sheet is set to a value which falls within a range of 50 µm to 200 µm, for example. A material of the sheet for forming the winding core 21 is not limited to a synthetic resin, and metal such as aluminum or copper may be used.

The layered body 22 is formed by stacking (overlapping) the positive electrode 23 and the negative electrode 24 to each other, and is wound around the winding core 21. The layered body 22 in this embodiment is formed by stacking the positive electrode 23, the negative electrode 24 and the separator 25 with each other.

The positive electrode 23 includes a metal foil and a positive active material layer formed on the metal foil. The metal foil has a strip shape. The metal foil in this embodiment is an aluminum foil, for example.

The positive active material layer contains a positive active material and a binder.

The positive active material is a lithium metal oxide, for example. To be more specific, the positive active material is a composite oxide ($Li_aCo_yO_2$, $Li_aNi_xO_2$, $Li_aMn_zO_4$, $Li_aNi_xCo_yMn_zO_2$ or the like) expressed by $Li_aMe_bO_c$ (Me expressing one, two or more transition metals), or a polyanionic compound ($Li_aFe_bPO_4$, $Li_aMn_bPO_4$, $Li_aMn_bSiO_4$, $Li_aCo_bPO_4F$ or the like) expressed by $Li_aMe_b(XO_c)_d$ (Me expressing one, two or more transition metals, and X expressing P, Si, B, V, for example), for example. In this embodiment, a positive active material is $LiNi_{1/3}Co_{1/3}Mn_{1/3}O_2$.

A binder used in forming a positive active material is, for example, polyvinylidene fluoride (PVdF), a copolymer of ethylene and vinyl alcohol, polymethylmethacrylate, polyethylene oxide, polypropylene oxide, polyvinyl alcohol, a polyacrylic acid, a polymethacrylic acid, or styrene-butadiene rubber (SBR). In this embodiment, a binder is polyvinylidene fluoride.

The positive active material layer may further contain a conductive assistant such as Ketjen Black (registered trademark), acetylene black or graphite. In this embodiment, the positive active material layer contains acetylene black as a conductive assistant.

The negative electrode 24 includes a metal foil and a negative active material layer formed on the metal foil. The metal foil has a strip shape. The metal foil in this embodiment is a copper foil, for example.

The negative active material layer contains a negative active material and a binder.

A negative active material is a carbon material such as graphite, hardly graphitizable carbon or easily graphitizable carbon, a material such as silicon (Si) or tin (Sn) which generates an alloying reaction with a lithium ion, or an oxide material such as lithium titanate, titanium dioxide, molybdenum dioxide or niobium pentoxide, for example. In this embodiment, a negative active material is graphite.

A binder used in forming a negative active material layer is substantially equal to a binder used in forming a positive active material layer. In this embodiment, a binder is polyvinylidene fluoride.

The negative active material layer may further contain a conductive assistant such as Ketjen Black (registered trademark), acetylene black or graphite. In this embodiment, the negative active material layer does not contain a conductive assistant.

In the electrode assembly 2 of this embodiment, the positive electrode 23 and the negative electrode 24 are wound in a state where the positive electrode 23 and the negative electrode 24 are insulated from each other by the separator 25. That is, in the electrode assembly 2 in this embodiment, the layered body 22 formed of the positive electrode 23, the negative electrode 24 and the separator 25 is wound (see FIG. 5). The separator 25 is a member having insulating property. The separator 25 is arranged between the positive electrode 23 and the negative electrode 24. Due to such arrangement, the positive electrode 23 and the negative electrode 24 are insulated from each other in the electrode assembly 2 (to be more specific, in the layered body 22). The separator 25 retains an electrolyte solution in the inside of the case 3. Accordingly, at the time of performing charging or discharging of the energy storage device 1, lithium ions move between the positive electrode 23 and the negative electrode 24 which are alternately layered with the separator 25 interposed therebetween. The separator 25 has a strip shape. The separator 25 is formed using a porous membrane such as a porous polyethylene membrane, a porous polypropylene membrane, a porous cellulose membrane, a porous polyamide membrane, for example. In this embodiment, the separator is formed using a porous polyethylene membrane.

The electrode assembly 2 is formed by winding the layered body 22 which is formed by stacking the positive electrode 23, the negative electrode 24 and the separator 25 as described above around the periphery of the winding core 21. By forming the electrode assembly 2 in such a manner, the electrode assembly 2 is formed into a shape which conforms to an outer peripheral surface of the winding core 21. That is, in the electrode assembly 2, a pair of curved portions (hereinafter referred to as "second curved portions") 201 and a pair of flat portions (hereinafter referred to as "second flat portions") 202 are formed.

The case 3 includes: a case body 31 having an opening; and a lid plate 32 which closes (seals) the opening of the case body 31. The case 3 stores an electrolyte solution in an inner space 33 thereof together with the electrode assembly 2, the current collectors 5 and the like. The case 3 is made of metal having resistance against an electrolyte solution.

An electrolyte solution is a nonaqueous-solution-based electrolyte solution. An electrolyte solution can be obtained by dissolving electrolyte salt in an organic solvent. An organic solvent is cyclic carbonate ester such as propylene carbonate or ethylene carbonate, or chain carbonate such as dimethyl carbonate, diethyl carbonate or ethylmethyl carbonate, for example. Electrolyte salt is $LiClO_4$, $LiBF_4$, $LiPF_6$ or the like. In this embodiment, an electrolyte solution is obtained by dissolving $LiPF_6$ of 1 mol/L into a mixture solvent which is prepared by mixing ethylene carbonate, dimethyl carbonate and ethylmethyl carbonate at a ratio of 3:2:5.

The case 3 is formed by joining an opening peripheral portion of the case body 31 and a peripheral portion of the lid plate 32 in a state where the opening peripheral portion of the case body 31 and the peripheral portion of the lid plate 32 overlap with each other. The case 3 has the previously mentioned inner space 33 defined by the case body 31 and the lid plate 32.

The case body 31 includes: a plate-shaped closure portion 311; and a cylindrical barrel portion 312 connected to a peripheral edge of the closure portion 311.

The closure portion 311 is a portion which is positioned at a lower end of the case body 31 when the case body 31 is arranged with the opening directed upward (that is, a portion which forms a bottom wall of the case body 31 when the case body 31 is arranged with the opening directed upward). The closure portion 311 has a rectangular shape as viewed in the normal direction of the closure portion 311.

Hereinafter, as shown in FIG. 1, assume the long side direction of the closure portion 311 as the X axis direction, the short side direction of the closure portion 311 as the Y axis direction, and the normal direction of the closure portion 311 as the Z axis direction.

The barrel portion 312 in this embodiment has an angular cylindrical shape. To be more specific, the barrel portion 312 has a flattened angular cylindrical shape. The barrel portion 312 has: a pair of long wall portions 313 which extends from long sides of a peripheral edge of the closure portion 311; and a pair of short wall portions 314 which extends from short sides of the peripheral edge of the closure portion 311. The angular cylindrical barrel portion 312 is formed by connecting corresponding end portions of the pair of long wall portions 313 arranged parallel to each other (to be more specific, end portions of the pair of long wall portions 313 which face each other in an opposed manner in a Y axis direction) by the short wall portions 314.

As described above, the case body 31 has an angular cylindrical shape with one end portion in the opening direction (Z axis direction) thereof closed (that is, a bottomed angular cylindrical shape).

The lid plate 32 is a plate-shaped member which closes the opening of the case body 31. To be more specific, a peripheral portion of the lid plate 32 is made to overlap with the opening peripheral portion of the case body 31 such that the lid plate 32 closes the opening of the case body 31. In this embodiment, a boundary portion between the lid plate 32 and the case body 31 is welded to each other in a state where the opening peripheral portion and the lid plate 32 are made to overlap with each other. The case 3 is formed through these steps. The lid plate 32 has a profile shape corresponding to the opening peripheral portion of the case body 31 as viewed in the Z axis direction. That is, the lid plate 32 is formed of a plate member having an elongated rectangular shape extending in the X axis direction as viewed in the Z axis direction.

A pair of through holes 322 which makes the inside and the outside of the case 3 communicate with each other is formed in the lid plate 32. The through holes 322 are used for making the electrode assembly 2 stored in the inside of the case 3 and the external terminals 4 arranged outside the case 3 conductive with each other. The through hole 322 is formed in both end portions of the lid plate 32 in the X axis direction respectively. Penetration members 7 described later are made to pass through the through holes 322 respectively.

The external terminals 4 are portions which are electrically connected to an external terminal of another energy storage device, external equipment or the like. The external terminals 4 are made of a material having conductivity.

The energy storage device 1 includes penetration members 7 which penetrate the case 3. The penetration member 7 makes the current collector 5 arranged in the inside of the case 3 and the external terminal 4 arranged outside the case 3 electrically conductive with each other. The penetration member 7 is made of metal having conductivity. The penetration member 7 extends to the inside of the case 3 from the external terminal 4 through the through hole 322 formed in the lid plate 32.

The current collectors 5 are arranged in the inside of the case 3, and are directly or indirectly electrically connected with the electrode assembly 2. The current collectors 5 in this embodiment are electrically connected with the electrode assembly 2 by way of clip members 50. The current collectors 5 are arranged on a positive electrode and a negative electrode of the energy storage device 1 respectively.

The energy storage device 1 includes an insulating member 6 which insulates the electrode assembly 2 and the case 3 from each other. In this embodiment, the insulating member 6 is an insulating cover, for example. The insulating cover 6 is arranged between the case 3 (to be more specific, the case body 31) and the electrode assembly 2. The insulating cover 6 is formed of a sheet-like member having insulating property. The insulating cover 6 is made of a resin such as polypropylene or polyphenylene sulfide. In this embodiment, the insulating cover 6 is formed into a bag shape by bending a sheet-like member which has insulating property and has a predetermined shape by cutting.

Instead of forming the insulating cover 6 into a bag shape by simply bending a sheet-like member, the insulating cover 6 may be formed into a bag shape by fusing or welding a sheet-like member, for example. The insulating cover 6 may be formed into a bag shape from the beginning. The electrode assembly 2 and the case 3 may be insulated from each other by forming an insulating layer on an inner surface of the case 3 instead of using the insulating cover 6.

In this embodiment, in the energy storage device 1, the electrode assembly 2 (to be more specific, the electrode assembly 2 and the current collectors 5) is stored in the case 3 in a state where the electrode assembly 2 is stored in the bag-shaped insulating cover 6. Here, the electrode assembly 2 is stored in the case 3 (in the inner space 33 of the case 3) such that the pair of second flat portions 202 is brought into contact with the case 3 (to be more specific, with the long wall portions 313) in an insulation state.

Figure 6:
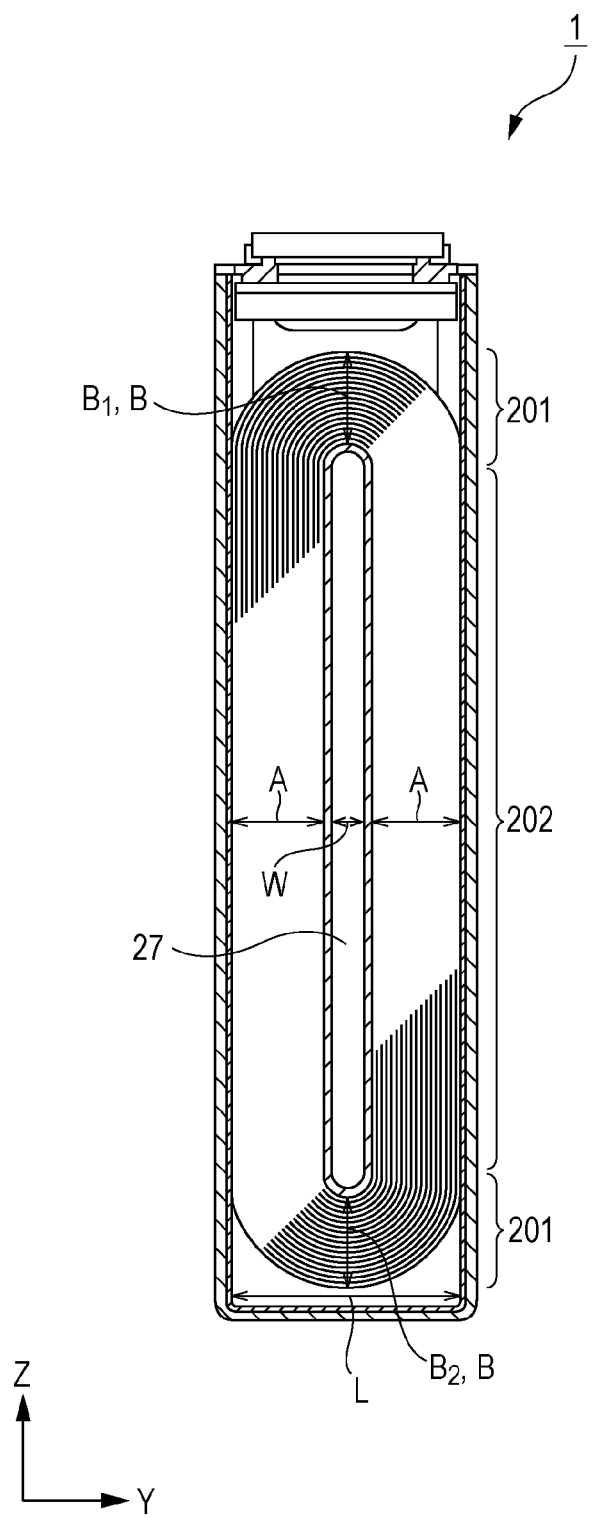
FIG. 6 is a view describing a method of measuring a parameter.

As shown in FIG. 6, assuming a thickness of the second flat portion 202 in a Y axis (minor axis) direction as A, a thickness of the second curved portion 201 in the radial direction as B, and a thickness of the hollow portion 27 in the Y axis (minor axis) direction as W, the electrode assembly 2 of the energy storage device 1 having the above-mentioned configuration satisfies the following formula (1) in a state where the electrode assembly 2 is discharged.

$$A+(W/2) \leq B \tag{1}$$

The above-mentioned parameters are measured in a state where the electrode assembly is stored in the case. The above-mentioned formula (1) is satisfied in a state where the electrode assembly 2 is stored in the case 3. The same goes for formulae described later.

The above-mentioned parameters can be measured using a microwave X ray scanner (MicroXCT-400 made by Xradia) and a software incorporated in the scanner. Specifically, the parameters can be obtained by measuring a distance between two points on an X-ray computed tomography image.

In the energy storage device 1 in this embodiment, the second curved portion 201 has a thickness size equal to or larger than a size of the second flat portion 202 in the thickness direction (the thickness of the second flat portion 202 in a Y axis direction (layered direction of electrodes 23, 24)+½ of a size W of hollow portion 27 in the Y axis direction) when the generation of a stress attributed to the expansion is suppressed by the absorption of the expansion of the electrodes 23, 24 due to charging by bending of the electrodes 23, 24 toward the hollow portion 27. Accordingly, a distance between the electrodes 23, 24 in the layered direction (radial direction) in the second curved portion 201 becomes a size at which the expansion of the electrodes 23, 24 due to charging can be absorbed. That is, the movement of the electrodes 23, 24 forming the second curved portion 201 can be moved in the radial direction in the second curved portion 201 and hence, it is possible to suppress the concentration of a stress attributed to the expansion on a boundary portion between the second flat portion 202 and the second curved portion 201. As a result, the formation of a wrinkle on the electrodes 23, 24 which form the boundary portion can be suppressed on the boundary portion. In the electrode assembly 2 of the energy storage device 1 in this embodiment, the hollow portion 27 is formed at the center of winding so that W>0 is satisfied.

In this embodiment, "a state where the energy storage device 1 (electrode assembly 2) is discharged" means a state where the energy storage device 1 is sufficiently discharged and an open circuit voltage is lowered to an extent that the energy storage device 1 is not overdischarged due to such discharging. In a lithium ion secondary battery where a composite oxide expressed by $Li_aMe_bO_c$ (Me expressing one, two or more transition metals) is used as a positive active material, and a carbon material such as graphite, hardly graphitizable carbon or easily graphitizable carbon is used as a negative active material, an open circuit voltage when the energy storage device is sufficiently discharged is usually 2V. Accordingly, in this embodiment, "a state where the energy storage device 1 (electrode assembly 2) is discharged" means "a state where an open circuit voltage is 2V". However, when a range of a voltage where the energy storage device 1 is used is set in accordance with equipment on which the energy storage device 1 is mounted, a catalog of the energy storage device 1 or the like, "a state where the energy storage device 1 (electrode assembly 2) is discharged" means a state where an open circuit voltage of the energy storage device 1 is the lowest voltage within the range of the voltage set above.

On the other hand, "a state where the energy storage device 1 (electrode assembly 2) is charged" means a state where, in equipment on which the energy storage device 1 is mounted, an open circuit voltage is the highest voltage within a range of the open circuit voltage which is expected to be used. For example, when charging processing is continuously performed with respect to the energy storage device 1 mounted on equipment, a state where a system on an equipment side determines that the charging of the energy storage device 1 is completed means "a state where the energy storage device 1 is charged". Further, when charging processing is intermittently performed with respect to the energy storage device 1 mounted on equipment, a state where an open circuit voltage of the energy storage device 1 reaches a voltage at which a system on the equipment determines that the charging of the energy storage device 1 is not necessary means "a state where the energy storage device 1 is charged". However, when a range of a voltage at which the energy storage device 1 is used is set in accordance with equipment on which the energy storage device 1 is mounted, a catalog of the energy storage device 1 or the like, "a state where the energy storage device 1 (electrode assembly 2) is charged" means a state where an open circuit voltage of the energy storage device 1 is the highest voltage within the range of the voltage set above.

In this embodiment, the electrode assembly 2 includes the winding core 21. Accordingly, the following formula (2) which is formulated by taking into account $((\pi/4)-(\frac{1}{2}))W$ which is a size of extension of the winding core 21 in the Z axis direction when the winding core 21 collapses in the Y axis direction in the formula (1) is also satisfied. The formula (2) is also a formula which is satisfied in a state where the electrode assembly 2 is discharged.

$$A+(\pi/4)W \leq B \tag{2}$$

To be more specific, the formula (2) is obtained as follows. As shown in FIG. 7, when the winding core 21 collapses in the Y axis direction (that is, when the winding core 21 collapses such that the first flat portions 212 of the winding core 21 which face each other in an opposed manner are brought into contact with each other: see a lower view in FIG. 7), a size of an extension of the winding core 21 in the Z axis direction is a value obtained by subtracting a length "W/2" which is a radius a of the first curved portion 211 of the winding core 21 before the winding core 21 collapses from a length "$(\pi/4)W$" of an arc β of the first curved portion 211 of the winding core 21.

$$((\pi/4)-(\frac{1}{2}))W \tag{3}$$

In view of the above, in the electrode assembly 2 having the winding core 21, by making the electrode assembly 2 satisfy the following formula (4) where a value of the size of the extension (formula (3)) is subtracted from a value B on a right side of the formula (1), even when the winding core 21 collapses in the Y axis direction, the formation of a wrinkle on the electrode assembly 2 having the winding core 21 can be suppressed. That is, by setting a thickness of the first curved portion 211 of the electrode assembly 2 in the radial direction by taking into account a size of the extension of the winding core 21 in the Z axis direction when the winding core 21 collapses in the Y axis direction, even in a state where the winding core 21 collapses in the Y axis direction, the formation of a wrinkle on the electrode assembly 2 having the winding core 21 can be suppressed.

$$A+(W/2) \leq B-((\pi/4)-(\frac{1}{2}))W \tag{4}$$

A lower view in FIG. 7 is a view schematically showing the winding core 21 which is collapsed in the Y axis direction. In the actual winding core 21, the winding core 21 is collapsed such that no gap is formed between the first flat portions 212 (that is, the first flat portions 212 are brought into contact with each other).

In the electrode assembly 2 of the energy storage device 1 in this embodiment, the winding core 21 has a hollow cylindrical shape and hence, unlike a solid winding core, the electrodes 23, 24 which form the second flat portion 202 can be bent toward a hollow-portion-27 side. Accordingly, when the electrodes 23, 24 which form the second flat portion 202 expand due to charging or the like, bending (expansion) of the electrodes 23, 24 toward the hollow-portion-27 side is allowed and, as a result, the formation of a wrinkle when the electrodes 23, 24 at the second flat portion 202 expand can be suppressed. Further, when the electrodes 23, 24 shrink, a reaction force is imparted to the electrodes 23, 24 by the winding core 21 from a hollow-portion-27 side and hence, the formation of a wrinkle when the electrodes 23, 24 shrink can be also suppressed.

In this embodiment, the electrode assembly 2 also satisfies the following formula (5) when the electrode assembly 2 is discharged.

$$B \leq A+W \tag{5}$$

By setting a thickness of the second curved portion 201 in the radial direction to a value equal to or less than a maximum size that the second flat portion 202 can take when the electrodes 23, 24 are bent toward the hollow portion so as to absorb the expansion of the electrodes 23, 24 due to charging (a thickness of the second flat portion 202 in a minor axis direction+a size of the hollow portion 27 in a minor axis direction), it is possible to prevent the occurrence of a case where a distance between the electrodes 23, 24 in the layered direction becomes excessively large in the second curved portion 201 thus lowering energy density.

In this embodiment, in the electrode assembly 2, in a state where the electrode assembly 2 is charged, in a region of at least a portion of the hollow portion 27 in the Z axis direction, portions of the electrode assembly which face each other with the hollow portion 27 sandwiched therebetween in the Y axis direction are brought into contact with each other. In this embodiment, the electrode assembly 2 includes the winding core 21 and hence, surfaces (first flat portions 212) of the winding core 21 which face each other in an opposed manner with the hollow portion 27 sandwiched therebetween in the Y axis direction are brought into contact with each other. On the other hand, in the electrode assembly 2 which does not include the winding core 21 (that is, the electrode assembly 2 formed of only the layered body 22), in a state where the electrode assembly 2 is charged, surfaces of the wound layered body 22 which face each other in an opposed manner with the hollow portion 27 sandwiched therebetween in the Y axis direction are brought into contact with each other.

It is preferable that, at a center region of the hollow portion 27 in the Z axis direction, portions of the electrode assembly 2 which face each other in an opposed manner with the hollow portion 27 sandwiched therebetween in the Y axis direction be brought into contact with each other in a state where the electrode assembly 2 is charged. It is more preferable that, over the whole region of the hollow portion 27 in the Z axis direction, portions of the electrode assembly 2 which face each other in an opposed manner with the hollow portion 27 sandwiched therebetween in the Y axis direction be brought into contact with each other in a state where the electrode assembly 2 is charged.

In this embodiment, as shown in FIG. 6, the electrode assembly 2 is stored in the case 3 such that the second flat portions 202 are brought into contact with the case 3 (to be more specific, the long wall portions 313) with the insulating cover 6 interposed therebetween. Assuming a size of the inner space 33 of the case 3 in the Y axis direction as L, the electrode assembly 2 also satisfies the following formula (6) in a state where the electrode assembly 2 is discharged.

$$W \leq 0.2L \quad (6)$$

Accordingly, it is possible to prevent the lowering of energy density of the electrode assembly 2 attributed to the increase of a distance between the electrodes 23, 24 in the layered direction at the second flat portion 202. In this case, it is preferable that W≤0.15 L be satisfied in a state where the electrode assembly 2 is discharged.

In this embodiment, the above-mentioned parameters A, B, W, L can be obtained as follows, for example.

The energy storage device 1 is discharged such that an open circuit voltage assumes 2V (that is, the energy storage device 1 is brought into a discharged state). Next, a hole is formed in both end portions of the closure portion 311 in the X axis direction using a drill or the like, and an electrolyte solution in the inside of the case 3 is discharged through the holes. Subsequently, a resin is supplied into the case 3 through the holes. After the supplied resin is cured, a center portion of the electrode assembly 2 in the X axis direction is cut together with the case 3 in the direction of a Y-Z plane (a plane including the Y axis and the Z axis). Sizes of the respective portions are measured in a cross section obtained by such cutting, the respective parameters are obtained.

In this embodiment, "A" indicates an average value of thicknesses (thicknesses in the Y axis direction) of two portions of the second flat portions 202 at the center position of the electrode assembly 2 in the Z axis direction. "B" indicates a thickness of the second curved portion 201 in the radial direction which passes a top position in the Z axis direction.

In this embodiment, the thickness B is obtained with respect to the pair of respective second curved portions 201. To be more specific, a thickness $B_1$ of the second curved portion 201 (the second curved portion 201 on an upper side in the example shown in FIG. 6) out of the pair of second curved portions 201 and a thickness $B_2$ of the second curved portion 201 (the second curved portion 201 on a lower side in the example shown in FIG. 6) out of the pair of second curved portions 201 are obtained respectively. In the electrode assembly 2 in this embodiment, both thicknesses $B_1$, $B_2$ of the pair of second curved portions 201 satisfy the formula (2) and the formula (5). That is, in the electrode assembly 2 of the energy storage device 1 in this embodiment, $A+(\pi/4)W \leq B_1 \leq A+W$ and $A+(\pi/4)W \leq B_2 \leq A+W$ are satisfied. Accordingly, in the energy storage device 1 in this embodiment, at a boundary portion between one second curved portion 201 out of the pair of second curved portions 201 and the second flat portion 202 and at a boundary portion between the other second curved portion 201 out of the pair of second curved portions 201 and the second flat portion 202, it is possible to suppress the formation of a wrinkle on the electrodes 23, 24.

"W" indicates a thickness of the hollow portion 27 in the Y axis direction at a center position in the Z axis direction (the position where "A" is measured). In this embodiment, the electrode assembly 2 includes the winding core 21 having a hollow cylindrical shape. Accordingly, "W" indicates a distance between inner surfaces of the winding core 21 (between the first flat portions 212). In the electrode assembly 2 which does not include the winding core 21, "W" indicates a distance between portions of the wound layered body 22 at inner peripheral surfaces which face each other in an opposed manner in the Y axis direction.

"L" indicates a size of the inner space 33 in the Y axis direction at a position where the size of the inner space 33 is minimally influenced by the deflection of the case 3, for example, as shown in FIG. 6, at a position in the vicinity of the closure portion 311. In this embodiment, a cross-sectional shape of the case 3 at connecting portions between the closure portion 311 and the long wall portions 313 have an arcuate shape. Accordingly, a size of the inner space 33 of the case 3 at boundary positions between the arcuate portions and the flat-shaped portions of the long wall portions 313 is assumed as L. When the energy storage device 1 includes the insulating cover 6 as in the case of the energy storage device 1 in this embodiment, an inner size of the insulating cover 6 is assumed as L. When the energy storage device 1 does not include the insulating cover 6, an inner size of the case 3 is assumed as L.

It is needless to say that the energy storage device of the present invention is not limited to the above-mentioned embodiment, and various modifications are conceivable without departing from the gist of the present invention. For example, the configuration of another embodiment may be added to the configuration of one embodiment. Alternatively, a part of the configuration of one embodiment may be replaced with the configuration of another embodiment. Further, a part of one embodiment may be omitted.

In the above-mentioned embodiment, the electrode assembly 2 includes the winding core 21 so that the formula (2) is satisfied. However, the electrode assembly 2 is not limited to such a configuration. When the electrode assembly 2 does not include the winding core 21 (when the electrode assembly 2 is formed of only the layered body 22), it is sufficient that the formula (1) is satisfied In the energy storage device 1 in the above-mentioned embodiment, the electrode assembly 2 is stored in the case 3 in a state where the second flat portions 202 of the electrode assembly 2 are brought into contact with the long wall portions 313 with the insulating cover 6 interposed therebetween. However, the energy storage device 1 is not limited to such a configuration. When an insulating layer is formed on the inner surface of the case 3 (inner surfaces of the long wall portions 313), the electrode assembly 2 may be stored in the case 3 in a state where the second flat portions 202 of the electrode assembly 2 are brought into contact with the inner surface of the case 3 (insulating layer). That is, it is sufficient that the electrode assembly 2 is stored in the inner space 33 of the case 3 such that the pair of respective second flat portions 202 is brought into contact with the long wall portions 313 in an insulation state.

In the electrode assembly 2 in the above-mentioned embodiment, the pair of respective second curved portions 201 satisfies the formula (2) (that is, $A+(\pi/4)W \leq B_1$ and $A+(\pi/4)W \leq B_2$ are satisfied). However, the electrode assembly 2 is not limited to such a configuration. In the electrode assembly 2, only either one of the second curved portions 201 may satisfy the formula (2) (that is, $A+(\pi/4)W \leq B_1$ or $A+(\pi/4)W \leq B_2$ may be satisfied). With such a configuration, the concentration of a stress attributed to the expansion of the electrodes due to charging can be suppressed at the boundary portion between one second curved portion 201 and the second flat portion 202 in the electrode assembly 2. As a result, the formation of a wrinkle (the formation of a wrinkle attributed to the expansion of the electrodes 23, 24 due to charging) on the electrodes 23, 24 at the boundary portion can be suppressed.

In the above-mentioned embodiment, the description has been made with respect to the case where the energy storage device is the chargeable/dischargeable non-aqueous electrolyte secondary battery (for example, lithium ion secondary battery). However, a type and a size (capacity) of the energy storage device 1 can be desirably selected. Further, in the above-mentioned embodiment, the description has been made with respect to the lithium ion secondary battery as one example of the energy storage device. However, the present invention is not limited to the lithium ion secondary battery. For example, the present invention is also applicable to various secondary batteries, primary batteries, and energy storage devices of capacitors such as electric double layer capacitors.

Figure 8:
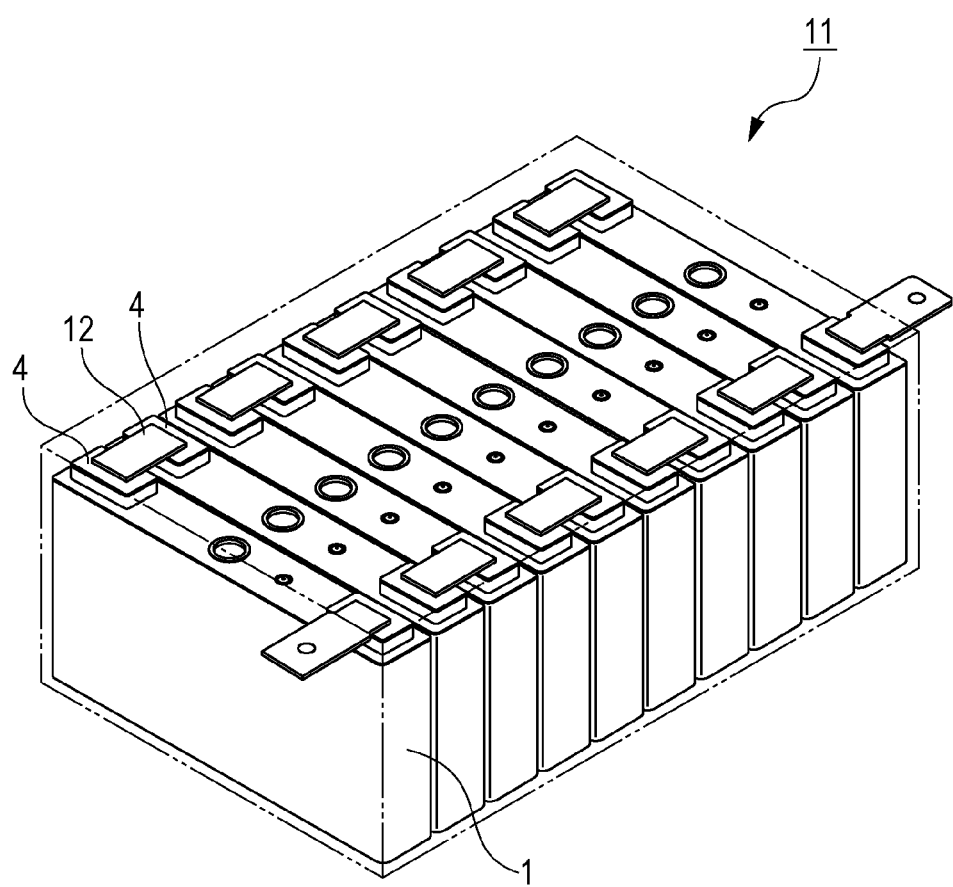
FIG. 8 is a perspective view of an energy storage apparatus including the energy storage device.

The energy storage device (for example, battery) may be used in an energy storage apparatus 11 (a battery module when an energy storage device 1 is a battery) shown in FIG. 8. The energy storage apparatus 11 includes at least two energy storage devices 1 and bus bar members 12 which electrically connect two (different) energy storage devices 1 with each other. In this case, it is sufficient that the technique of the present invention is applied to at least one of two energy storage devices 1.

What is claimed is:

1. An energy storage device comprising:
   a flattened electrode assembly formed by winding electrodes such that a hollow portion is formed at a center of winding, the electrode assembly having a minor axis and a major axis which are orthogonal to each other, the electrode assembly including a pair of curved portions opposed in the major axis direction and a pair of flat portions opposed in the minor axis direction, the flat portions connecting corresponding end portions of the curved portions to each other; and
   a case storing the electrode assembly therein, wherein
   assuming a thickness of one of the pair of flat portions in the minor axis direction as A, a thickness of one of the pair of curved portions in a radial direction as B, and a thickness of the hollow portion in the minor axis direction as W, the electrode assembly satisfies a following formula in a state where the electrode assembly is discharged $A+(W/2) \leq B.$ 2. The energy storage device according to claim 1, wherein
   the electrode assembly includes a cylindrical winding core which surrounds the hollow portion, and
   the electrodes are wound around the periphery of the winding core.

3. The energy storage device according to claim 2, wherein
   the electrode assembly satisfies the following formula in a state where the electrode assembly is discharged $A+(\pi/4)W \leq B.$ 4. The energy storage device according to claim 1, wherein
   the electrode assembly satisfies the following formula in a state where the electrode assembly is discharged $B \leq A+W.$ 5. The energy storage device according to claim 1, wherein
   in a state where the electrode assembly is charged, in a region of at least a portion of the hollow portion in the major axis direction, portions of the electrode which face each other with the hollow portion sandwiched therebetween in the minor axis direction are brought into contact with each other.

6. The energy storage device according to claim 1, wherein
   the case has an inner space and stores the electrode assembly in the inner space such that the flat portions are respectively brought into contact with the case in an insulated state, and
   assuming a size of the inner space of the case in the minor axis direction as L, the electrode assembly satisfies the following formula in a state where the electrode assembly is discharged $W \leq 0.2L.$ 7. The energy storage device according to claim 1, wherein
   assuming a thickness of one curved portion out of the pair of curved portions in a radial direction as $B_1$, and a thickness of the other curved portion in the radial direction as $B_2$, the electrode assembly satisfies the following formula in a state where the electrode assembly is discharged $A+(W/2) \leq B_1$ and $A+(W/2) \leq B_2.$ 8. The energy storage device according to claim 1, wherein
   the electrodes include a positive electrode and a negative electrode, and
   the negative electrode includes graphite as a negative active material.

9. The energy storage device according to claim 1, wherein
   the electrodes include a positive electrode and a negative electrode, and
   an active material of the negative electrode is graphite.

* * * * *